United States Patent
Lee et al.

(10) Patent No.: US 9,680,582 B2
(45) Date of Patent: Jun. 13, 2017

(54) METHOD AND APPARATUS FOR ACQUIRING SERVICE AREA INFORMATION IN WIRELESS COMMUNICATION SYSTEM

(71) Applicant: LG ELECTRONICS INC., Seoul (KR)

(72) Inventors: Young Dae Lee, Anyang-si (KR); Seung June Yi, Anyang-si (KR); Sung Jun Park, Anyang-si (KR); Sung Hoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

(21) Appl. No.: 13/879,599

(22) PCT Filed: Sep. 26, 2012

(86) PCT No.: PCT/KR2012/007743
§ 371 (c)(1),
(2) Date: Apr. 15, 2013

(87) PCT Pub. No.: WO2013/048104
PCT Pub. Date: Apr. 4, 2013

(65) Prior Publication Data
US 2013/0195003 A1    Aug. 1, 2013

Related U.S. Application Data

(60) Provisional application No. 61/539,470, filed on Sep. 26, 2011.

(51) Int. Cl.
*H04H 20/72* (2008.01)
*H04W 36/08* (2009.01)
*H04W 48/10* (2009.01)

(52) U.S. Cl.
CPC ............ *H04H 20/72* (2013.01); *H04W 36/08* (2013.01); *H04W 48/10* (2013.01)

(58) Field of Classification Search
CPC . H04W 4/06; H04W 72/005; H04W 72/0413; H04W 72/42; H04W 48/10; H04W 48/20; H04W 72/045
(Continued)

(56) References Cited

U.S. PATENT DOCUMENTS 8,982,872 B2 * 3/2015 Gou ........................ H04L 49/90
370/350
2008/0268878 A1    10/2008 Wang et al.
(Continued)

FOREIGN PATENT DOCUMENTS

EP    2144381    *    1/2010
KR    10-2010-0003365 A    1/2010
(Continued)

OTHER PUBLICATIONS

3GPP TSG-RAN WG2 Meeting #73bis, "Alcatel-Lucent Shanghai Bell, Alcatel-Lucent", Apr. 11-15, 2011, R2-112229, pp. 1-4.
(Continued)

*Primary Examiner* — Xavier Szewai Wong
(74) *Attorney, Agent, or Firm* — Birch, Stewart, Kolasch & Birch, LLP

(57) ABSTRACT

Provided are a method and apparatus for acquiring multimedia broadcast/multicast service (MBMS) service area information in a wireless communication system. User equipment (UE) acquires at least one first MBMS service area identity (SAI), which corresponds to a MBMS service provided at a first carrier frequency, from system information broadcasted from a first cell. The UE acquires at least one second carrier frequency, which neighbors the first carrier frequency and at which the MBMS service is pro-
(Continued)

vided, and at least one second MBMS SAI, which corresponds to the MBMS service provided at the at least one second carrier frequency, from the system information.

14 Claims, 8 Drawing Sheets

(58) Field of Classification Search
USPC .................................. 370/310, 312; 455/450
See application file for complete search history.

(56) References Cited

U.S. PATENT DOCUMENTS

| | | | |
|---|---|---|---|
| 2009/0262693 A1* | 10/2009 | Wang | H04W 48/12 370/329 |
| 2010/0189027 A1 | 7/2010 | Ishida et al. | |
| 2011/0103288 A1* | 5/2011 | Lee et al. | 370/312 |
| 2011/0149827 A1 | 6/2011 | Na et al. | |
| 2011/0222457 A1 | 9/2011 | Lee et al. | |
| 2011/0305184 A1* | 12/2011 | Hsu | 370/312 |
| 2012/0170502 A1* | 7/2012 | Korus et al. | 370/312 |
| 2012/0236776 A1* | 9/2012 | Zhang | H04W 48/12 370/312 |
| 2013/0039250 A1* | 2/2013 | Hsu | 370/312 |

FOREIGN PATENT DOCUMENTS

| | | |
|---|---|---|
| KR | 10-2010-0103381 A | 9/2010 |
| KR | 10-2010-0118515 A | 11/2010 |
| KR | 10-2011-0071814 A | 6/2011 |
| WO | WO2011019977 * | 2/2011 |

OTHER PUBLICATIONS

3GPP TSG-RAN WG2 Meeting #75 "How does the UE determine whether neighbour cells of MBMS frequency can provide the service(s) that it is interested to receive?", Aug. 22-26, 2011, R2-114430, pp. 1-4.

3GPP TSG-RAN2#77 meeting, "Provision of MBMS assistance info by RAN", Feb. 6-10, 2011, R2-120426.

\* cited by examiner (a)

(b)

METHOD AND APPARATUS FOR ACQUIRING SERVICE AREA INFORMATION IN WIRELESS COMMUNICATION SYSTEM

CROSS REFERENCE TO RELATED APPLICATIONS

This application is the National Phase of PCT/KR2012/007743 filed on Sep. 26, 2012, which claims priority under 35 U.S.C. 119(e) to U.S. Provisional Application No. 61/539,470 filed on Sep. 26, 2011, all of which are hereby expressly incorporated by reference into the present application.

BACKGROUND OF THE INVENTION

Field of the Invention

The present invention relates to wireless communication, and more particularly, to a method and apparatus for transmitting system information in a wireless communication system.

Related Art

A universal mobile telecommunications system (UMTS) is a $3^{rd}$ generation asynchronous mobile communication system operating in wideband code division multiple access (WCDMA) on the basis of European systems such as global system for mobile communications (GSM), general packet radio services (GPRS), etc. Long-term evolution (LTE) of the UMTS is under discussion by $3^{rd}$ generation partnership project (3GPP) which standardizes the UMTS. The 3GPP LTE is a technique for high-speed packet communication. The 3GPP LTE requires cost reduction for a user and a provider, improvement of service quality, extended and improved coverage and system capacity, flexible use of frequency bands, a simple structure, an open interface, a proper power use of a terminal, etc. For this, various methods have been proposed.

The 3GPP LTE can provide a multimedia broadcast/multicast service (MBMS) service. The MBMS is a service which simultaneously transmits data packets to multiple users. If a specific level of users exist in the same cell, the respective users can be allowed to share necessary resources so that the plurality of users can receive the same multimedia data, thereby increasing resource efficiency. In addition, a multimedia service can be used with a low cost from the perspective of users.

The MBMS service can be provided by using a single frequency network (SFN) through a frequency layer shared with a non-MBMS service. A terminal which intends to receive the MBMS service can acquire information of the MBMS service provided on a current carrier frequency by using control information which is broadcast at a frequency on which the MBMS service is provided. In addition, according to a situation, the terminal may also desire to receive an MBMS service provided on another carrier frequency other than the current carrier frequency.

Accordingly, there is a need for a method in which a terminal can effectively receive an MBMS service provided on a different carrier frequency.

SUMMARY OF THE INVENTION

The present invention provides a method and apparatus for transmitting system information in a wireless communication system. The present invention also provides a method of transmitting information on a current carrier frequency and a neighboring carrier frequency by using system information.

In an aspect, a method of acquiring multimedia broadcast/multicast service (MBMS) service area information by a user equipment (UE) in a wireless communication system is provided. The method includes receiving system information which is broadcast from a first cell operating on a first carrier frequency, acquiring at least one first MBMS service area identify (SAI), from the received system information, corresponding to an MBMS service provided on the first carrier frequency, and acquiring from the received system information at least one second carrier frequency neighboring to the first carrier frequency and providing an MBMS service and at least one second MBMS SAI corresponding to an MBMS service provided on the at least one second carrier frequency.

In another aspect, a user equipment (UE) for acquiring multimedia broadcast/multicast service (MBMS) service area information in a wireless communication system is provided. The UE includes a radio frequency (RF) unit for transmitting or receiving a radio signal, and a processor coupled to the RF unit. The processor is configured for receiving system information which is broadcast from a first cell operating on a first carrier frequency, acquiring at least one first MBMS service area identify (SAI), from the received system information, corresponding to an MBMS service provided on the first carrier frequency, and acquiring from the received system information at least one second carrier frequency neighboring to the first carrier frequency and providing the MBMS service and at least one second MBMS SAI corresponding to an MBMS service provided on the at least one second carrier frequency.

A terminal can effectively receive a multimedia broadcast/multicast service (MBMS) service provided on a neighboring carrier frequency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
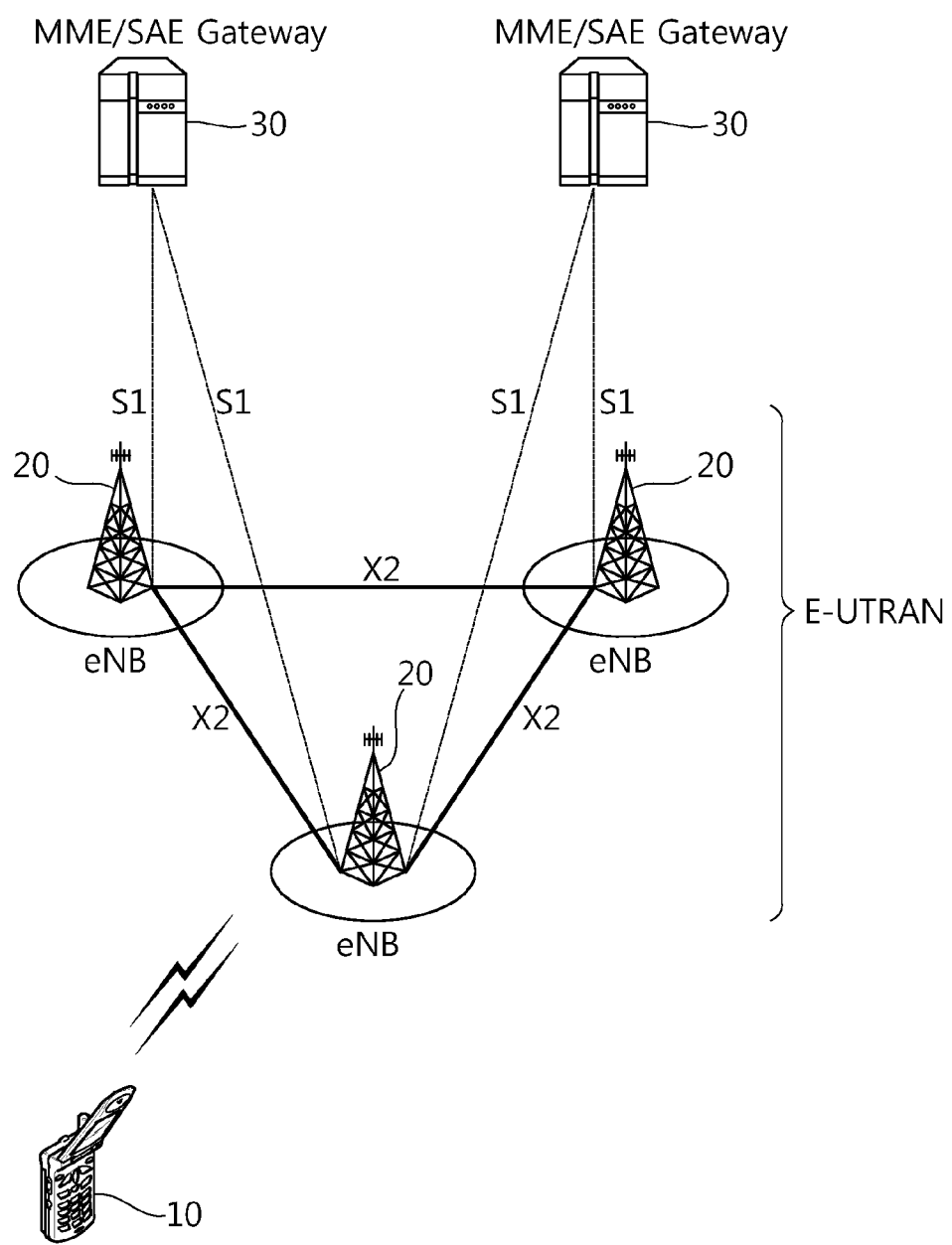
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. More particularly, the BSs 20 are connected to a mobility management entity (MME) 30 by means of an S1-MME, and are connected to a serving gateway (S-GW) by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a user plane which is a protocol stack for data information transmission and a control plane which is a protocol stack for control signal transmission.

Figure 2:
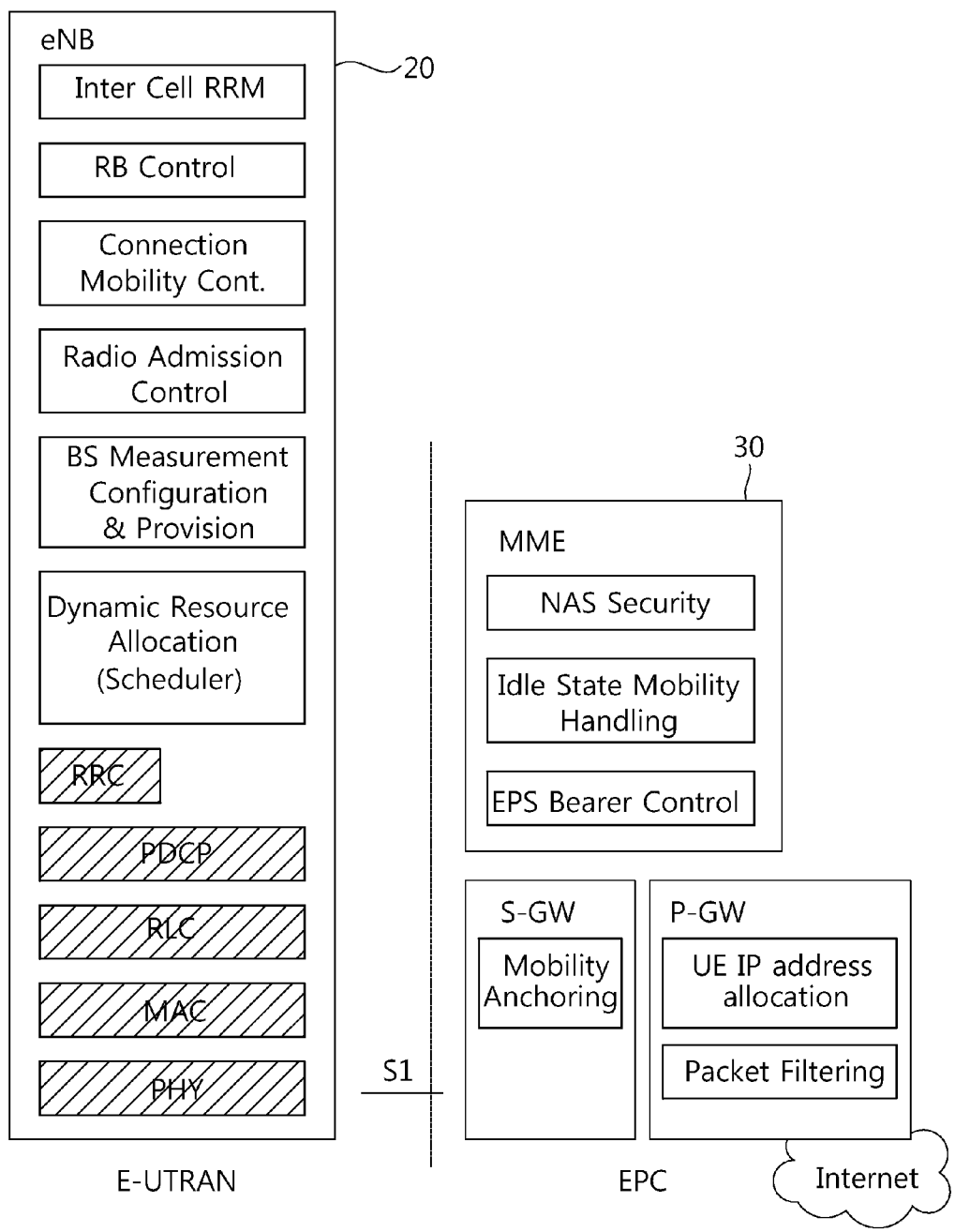
FIG. 2 is a diagram showing a radio protocol architecture for a user plane.
Figure 3:
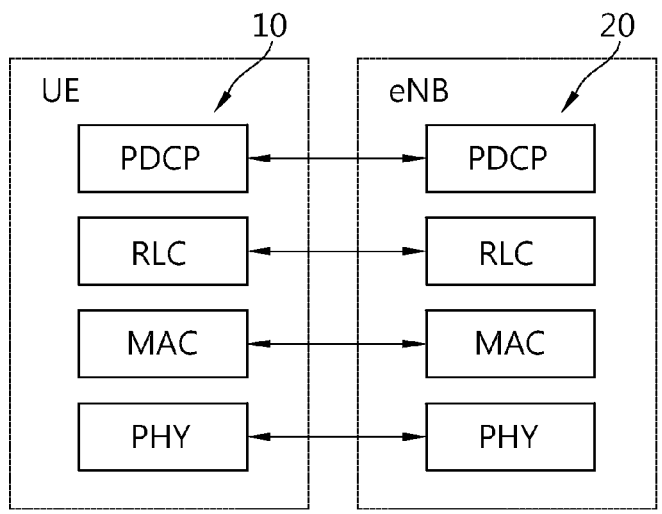
FIG. 3 is a diagram showing a radio protocol architecture for a control plane.
Figure 3:
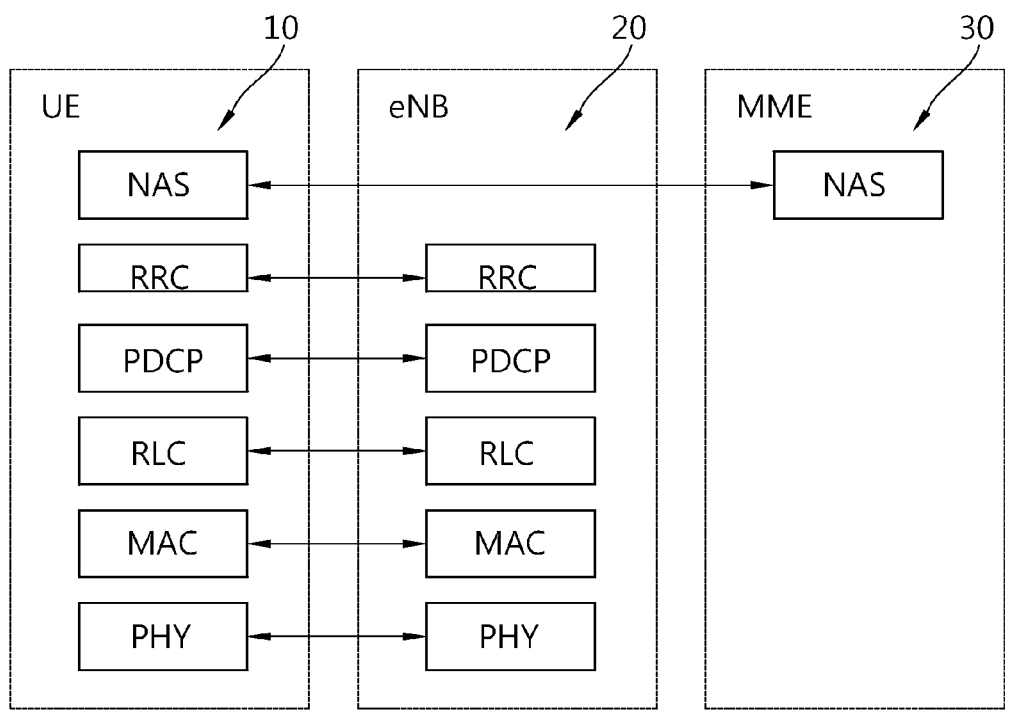

FIG. 2 is a diagram showing a radio protocol architecture for a user plane. FIG. 3 is a diagram showing a radio protocol architecture for a control plane.

Referring to FIGS. 2 and 3, a physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
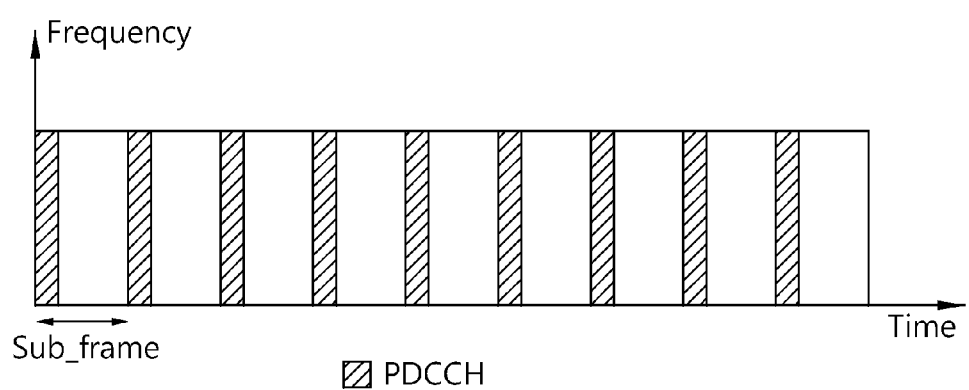
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane. Meanwhile, when an RRC connection is established between an RRC layer of the UE and an RRC layer of the network, the UE is in an RRC connected state, and otherwise the UE is in an RRC idle state.

A non-access stratum (NAS) layer belongs to an upper layer of the RRC layer and serves to perform session management, mobility management, or the like.

As a transport channel for an MBMS, an MCH can be mapped to a multicast control channel (MCCH) which is a logical channel for a control signal and a multicast traffic channel (MTCH) which is a logical channel for data. The MCCH can transmit an MBMS-related RRC message. The MTCH can transmit traffic of a specific MBMS service. A single MCCH channel may exist for every single MBSFN for transmitting MBMS information and traffic. Alternatively, when a plurality of MBSFN areas are provided in a single cell, the UE may receive a plurality of MCCHs. When the MBMS-related RRC message is changed in a specific MCCH, the PDCCH can transmit an MBMS radio network temporary identity (M-RNTI) and an MCCH indicator indicating a specific MCCH. By receiving the M-RNTI and the MCCH indicator through the PDCCH, the UE supporting the MBMS can determine that the MBMS-related RRC message is changed in the specific MCCH and can receive the specific MCCH. An RRC message of the MCCH can be changed in every modification period, and can be repetitively broadcast in every repetition period.

Figure 5:
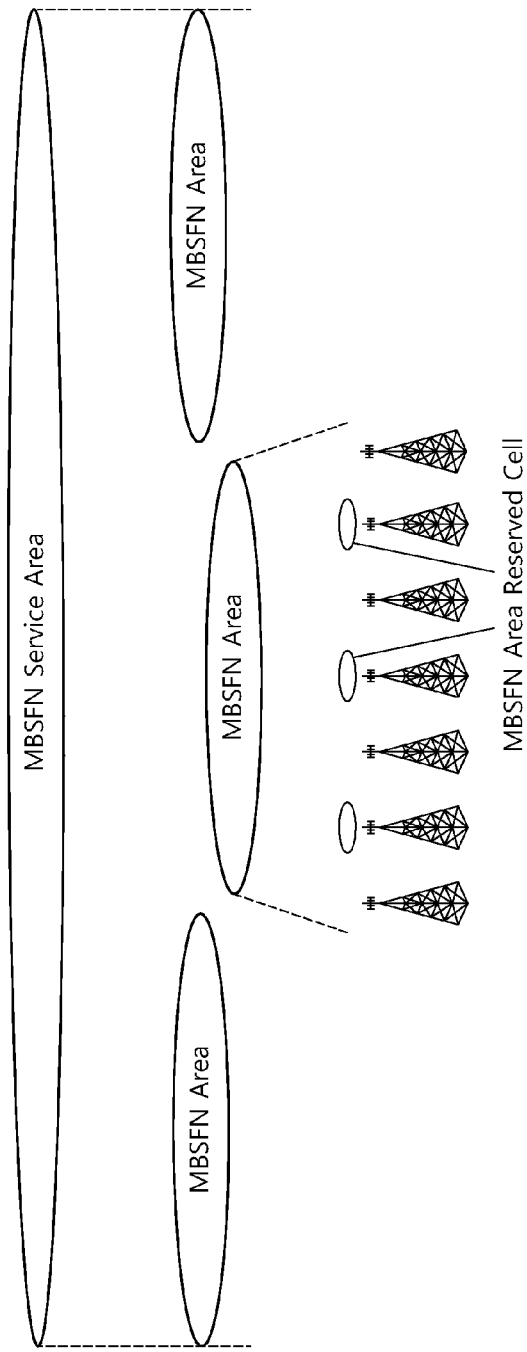
FIG. 5 shows a structure of an MBMS service area and an MBSFN area.

FIG. 5 shows a structure of an MBMS service area and an MBSFN area.

The MBMS service area is an area in which a specific MBMS service is provided. Although not shown in FIG. 5, an MBSFN synchronization area is a network area in which all BSs can be synchronized and perform MBSFN transmission. The MBSFN synchronization area can support one or more MBSFN areas. In a given frequency layer, the BS may belong to one MBSFN synchronization area. The MBSFN synchronization area can be configured independent of the MBMS service area. The MBSFN area may include a group of cells in the MBSFN synchronization area. Except for a reserved cell of the MBSFN area, all cells in the MBSFN area can perform MBSFN transmission. When a UE can know which MBSFN area is applied for an MBMS service interested by the UE, it is enough to consider only a subset of the configured MBSFN area. The reserved cell of the MBSFN area is a cell located in the MBSFN area and not performing MBSFN transmission.

Meanwhile, the network can use a counting procedure to calculate the number of UEs receiving a specific service. The counting procedure can be configured such that the network transmits a counting request message, and then the UE transmits a counting response message.

Figure 6:
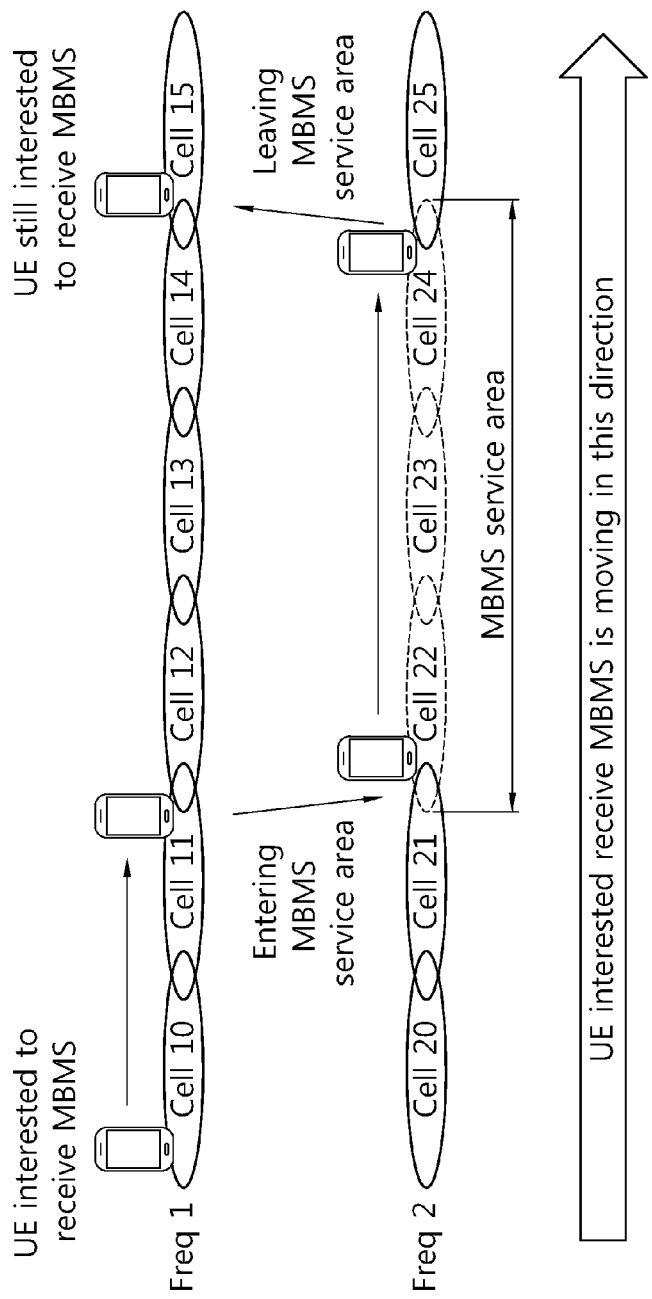
FIG. 6 shows a process of providing MBMS service continuity to a UE in an idle mode.

FIG. 6 shows a process of providing MBMS service continuity to a UE in an idle mode.

Referring to FIG. 6, a service is currently provided to a UE on a freq 1. If the UE is interested in receiving of the MBMS service while moving from a cell 10 to a cell 11 on the freq 1, the UE can leave the cell 11 on the freq 1 to enter an MBSFN area by reselecting a cell 22 on a freq 2. The UE can reselect the cell 22 by assigning a highest reselection priority to the freq 2. The MBSFN area can be continued from the cell 22 to a cell 24 on the freq 2. As the UE continuously moves, the UE leaves the MBSFN area, and enters a cell 15 on the freq 1.

In this case, it matters whether the UE is located in an MBMS service area. For example, in FIG. 6, the UE can know that the MBMS service is provided on the freq 2, but not all of cells provide the MBMS service at the freq 2. In FIG. 6, the cells 22 to 24 correspond to the MBSFN area, and the cells 20, 21, and 25 may not provide the MBMS service. That is, when the UE is located in the cell 10 on the freq 1, it matters how to recognize that the cell 20 does not provide the MBMS service on the freq 2.

The UE which intends to receive the MBMS service can acquire information of the MBMS service provided on a current carrier frequency by using control information which is broadcast at a frequency on which the MBMS service is provided. However, the UE does not know information on an MBMS service provided on a neighboring carrier frequency. The UE may intend to receive the MBMS service provided on the neighboring carrier frequency. The UE may directly receive control information which is broadcast at the neighboring carrier frequency and thus acquire the information of the MBMS service provided on the neighboring carrier frequency. However, since the UE directly finds and receives the control information which is broadcast at the neighboring carrier frequency, there may be a problem in that battery consumption of the UE is increased.

Therefore, the present invention provides a method of acquiring information related to an MBMS service provided on a neighboring carrier frequency by using system information, in order for a UE to effectively receive the MBMS service provided on the neighboring carrier frequency without significant battery consumption. The UE may access to a first cell providing a first carrier frequency and receive system information which is broadcast by the first cell, and may acquire, from the received information, a second carrier frequency providing the MBMS service and information on an MBMS service area provided by a second cell. If a service area of the MBMS service to be received is included in the information on the MBMS service area, the UE may reselect the second cell providing the second carrier frequency.

information through the F1. The system information may be specified to at least one specific MBMS service. An SIB may include at least one identify of a carrier frequency and at least one identity of an MBMS service area corresponding to the carrier frequency. For example, the system information can indicate at least one F2 by using an identity of the F2, and can indicate at least one MBMS service area provided on the F2 by using an identity of the MBMS service area.

The system information received by the UE through the F1 may be a system information block (SIB) 13. Alternatively, the system information received by the UE through the F1 may be a newly defined SIB 15. The SIB 15 may include MBMS service area identities (SAIs) of current and/or neighboring carrier frequencies. Table 1 shows an example of the SIB 15.

TABLE 1

```
-- ASN1START
SystemInformationBlockType15-r11 ::= SEQUENCE {
sai-IntraFreq-r11 MBMS-SAI-List-r11 OPTIONAL, -- Need OR
sai-InterFreqList-r11 MBMS-SAI-InterFreqList-r11 OPTIONAL, -- Need OR
lateNonCriticalExtension OCTET STRING OPTIONAL, -- Need OP
...
}
MBMS-SAI-List-r11::= SEQUENCE (SIZE (1..maxSAI-MBMS-r11)) OF MBMS-SAI-r11
MBMS-SAI-r11::= INTEGER (0..65535)
MBMS-SAI-InterFreqList-r11::=SEQUENCE (SIZE (1..maxFreq)) OF
MBMS-SAI-InterFreq-r11
MBMS-SAI-InterFreq-r11::=SEQUENCE {
dl-CarrierFreq ARFCN-ValueEUTRA,
sai-List-r11 MBMS-SAI-List-r11,
...
}
-- ASN1STOP
```

Hereinafter, the proposed method will be described in detail according to an embodiment of the present invention.

Figure 7:
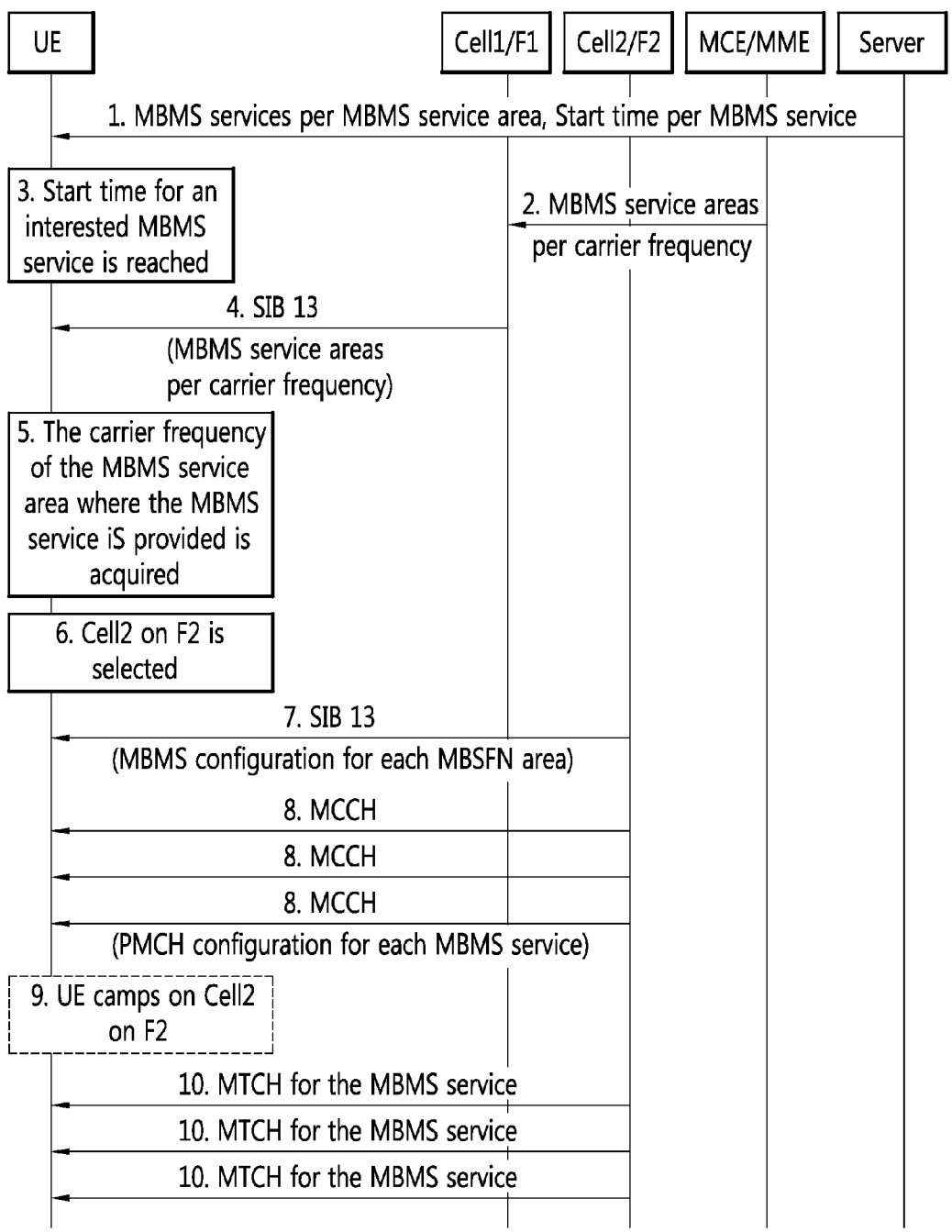
FIG. 7 shows the proposed system information transmission method according to an embodiment of the present invention.

FIG. 7 shows the proposed system information transmission method according to an embodiment of the present invention.

1. A UE receives information on MBMS services per MBMS service area. The MBMS service area may include at least one cell providing an MBMS service interested by the UE. In addition, the MBMS service area may include at least one MBSFN area providing the MBMS service interested by the UE. The information on MBMS services can be received from an MBMS application server or a broadcast and multicast service center (BM-SC). In addition, the UE can receive information on a start time of transmission of a specific MBMS service.

2. An MBMS coordination entity (MCE)/MME can acquire information indicating which MBMS service area is covered on a specific carrier frequency from the MBMS application server or the BM-SC. That is, the MCE/MME can receive information on a mapping relation of at least one carrier frequency and at least one MBMS service area. The MCE/MME can transmit the acquired information to a BS managing a first cell. The first cell provides a first carrier frequency F1.

3. The UE determines whether it is a time to start the MBMS service interested by the UE.

4. The UE accesses to the first cell providing the F1. The first cell can broadcast information indicating which MBMS service area is covered on a second carrier frequency F2 provided by a second cell which is a neighboring cell by using system information. If it is time to start the MBMS service interested by the UE, the UE receives the system information through the F1. The system information may be specified to at least one specific MBMS service. An SIB may include at least one identify of a carrier frequency and at least one identity of an MBMS service area corresponding to the carrier frequency. For example, the system information can indicate at least one F2 by using an identity of the F2, and can indicate at least one MBMS service area provided on the F2 by using an identity of the MBMS service area.

In Table 1, a 'sai-IntraFreq' field includes a list of MBMS SAIs of a carrier frequency currently accessed by the UE. A 'sai-InterFreqList' field includes a list of neighboring frequencies providing an MBMS service and a list of MBMS SAIs corresponding thereto. A 'sai-List' field includes a list of MBMS SAIs for a specific frequency.

5. The UE acquires a carrier frequency of an MBMS service area providing an interested MBMS service by using the received system information. Accordingly, the UE can know that the carrier frequency of the interested MBMS service area is F2.

6. The UE reselects a cell on the F2 on the basis of channel quality.

7. The UE receives system information from the second cell providing the F2. The system information may be the SIB 13. Alternatively, the system information may be the newly defined SIB 15 of Table 1. The UE can acquire information indicating which MBSFN area is provided on the second carrier frequency. If a specific MBSFN area is mapped to an MBMS service area providing the interested MBMS service, the UE can configure an MCCH corresponding to the specific MBSFN area to receive the interested MBMS service. The UE can report in advance a mapping relation of the MBSFN area and the MBMS service area by using the MBMS application server, the BM-SC, the MCE/MME, etc.

8. The UE periodically monitors the MCCH to check whether a session of the interested MBMS service starts. In this case, the UE may be connected to the first cell. If the UE is connected to the first cell, the UE can use a timer for monitoring the MCCH on the F2. Whenever the UE monitors the MCCH on the F2, the UE can start or restart the timer. During the timer is running, the UE may be connected to the first cell. At the expiry of the timer, the UE monitors the MCCH on the F2. As a result of monitoring the MCCH, if the MBMS service is not transmitted on the F2, the UE is connected again to the first cell on the F1. Alternatively, if the interested MBMS service starts, the UE can move from the first cell on the F1 to the second cell on the F2, and can be continuously connected to the second cell.

9. If transmission of the session of the interested MBMS service starts, the UE connected to the first cell is connected to the second cell.

10. If transmission of the session of the interested MBMS service starts, the UE can configure the MTCH on a physical multicast channel (PMCH), and can receive the interested MBMS service on the MTCH.

Figure 8:
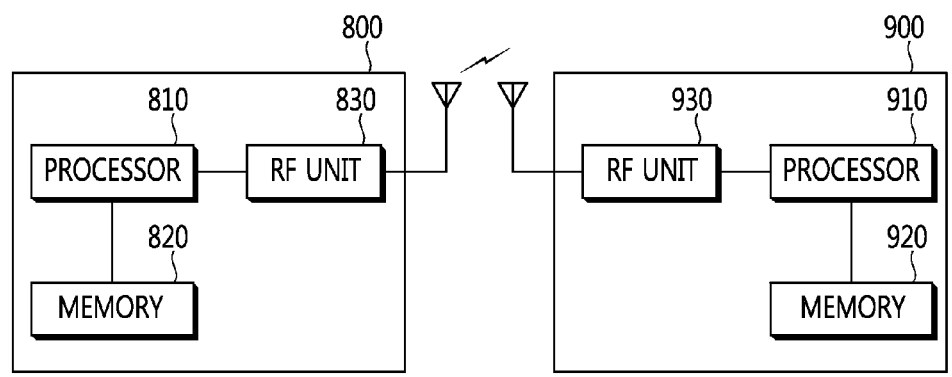
FIG. 8 is a block diagram showing wireless communication system to implement an embodiment of the present invention.

FIG. 8 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A terminal 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of communicating between a user equipment (UE) and a network in a mobile communication system, the method comprising:
receiving, by the UE, a multimedia broadcast multimedia service (MBMS) service from a first cell in a first frequency while the UE is in an idle mode;
receiving, by the UE, a first system information block (SIB) from the first cell in the first frequency, the first SIB including information on an MBMS service area (SA) provided at a second frequency;
receiving, by the UE, a second SIB from a second cell in the second frequency, the second SIB including information on a multimedia broadcast multicast single frequency network (MBSFN) area; and
receiving, by the UE, the MBMS service from the second cell in the second frequency.

2. The method of claim 1, wherein the second frequency is a different frequency than the first frequency.

3. The method of claim 1, wherein the second frequency is a neighboring frequency of the first frequency.

4. The method of claim 1, wherein the MBMS service corresponds to the MBMS SA.

5. The method of claim 1, wherein the first SIB and the second SIB are received while the UE is in the idle mode.

6. The method of claim 1, wherein the first SIB is a SIB 15.

7. The method of claim 1, wherein the second SIB is a SIB 13.

8. A user equipment (UE) configured to communicate with a network in a mobile communication system, the UE comprising:
a transceiver; and
a processor, coupled to the transceiver, that:
controls the transceiver to receive a multimedia broadcast multimedia service (MBMS) service from a first cell in the first frequency while the UE is in an idle mode;
controls the transceiver to receive a first system information block (SIB) from the first cell in a first frequency, the first SIB including information on an MBMS service area (SA) provided at a second frequency,
controls the transceiver to receive a second SIB from a second cell in the second frequency, the second SIB including information on a multimedia broadcast multicast single frequency network (MBSFN) area, and
controls the transceiver to receive the MBMS service from the second cell in the second frequency.

9. The UE of claim 8, wherein the second frequency is a different frequency than the first frequency.

10. The UE of claim 8, wherein the second frequency is a neighboring frequency of the first frequency.

11. The UE of claim 8, wherein the MBMS service corresponds to the MBMS SA.

12. The UE of claim 8, wherein the first SIB and the second SIB are received while the UE is in the idle mode.

13. The UE of claim 8, wherein the first SIB is a SIB 15.

14. The UE of claim 8, wherein the second SIB is a SIB 13.

* * * * *